United States Patent [19]
Spencer et al.

[11] Patent Number: 5,014,064
[45] Date of Patent: May 7, 1991

[54] MONOPULSE TRACKING APPARATUS AND METHOD OF OPERATING SAME

[75] Inventors: George R. Spencer, Bedford, N.H.; Bernard J. Thompson, Concord, Mass.; Malcolm E. Skinner, Andover, Mass.; Philip L. Sullivan, Acton, Mass.

[73] Assignee: Raytheon Company, Lexington, Mass.

[21] Appl. No.: 382,971

[22] Filed: Jul. 10, 1989

[51] Int. Cl.$^5$ .............................................. G01S 13/00
[52] U.S. Cl. .................................. 342/152; 342/149; 342/427
[58] Field of Search ................ 342/427, 149, 152, 194

[56] References Cited

PUBLICATIONS

Merrill I. Skolnik, Radar Handbook, copyright 1970 by McGraw-Hill, Inc., pp. 21-24, 21-25 and 21-28, 2130.

Primary Examiner—Theodore M. Blum
Attorney, Agent, or Firm—Donald F. Mofford; Edmund J. Walsh; Richard M. Sharkansky

[57] ABSTRACT

A method of processing in a two-channel monopulse receiver and processor is shown to include the steps of: (a) forming composite signals equal to $[S+(p+jy)]$ and $[S-(p+jy)]$ where S in a monopulse sum signal and p and y are, respectively, pitch and yaw error signals; (b) alternately passing the composite signals through a two-channel amplifier; and (c) separating the components in the resulting amplified composite signals for conventional monopulse processing and smoothing to eliminate the effects of any imbalance (in phase or amplitude) between the channels in the two-channel amplifier.

8 Claims, 7 Drawing Sheets

MONOPULSE TRACKING APPARATUS AND METHOD OF OPERATING SAME

BACKGROUND OF THE INVENTION

This invention pertains generally to monopulse radars, and particularly to signal processing techniques for use in processing signals in monopulse radars to derive normalized pitch and yaw error signals that define bore-sight angle error of any target.

It is known in the art that a monopulse receiver with a single channel intermediate frequency receiver may be used to determine pitch and yaw error signals by appropriate frequency or time multiplexing of the monopulse sum, pitch and yaw error signals. Thus, if radio frequency (R.F.) monopulse sum, pitch and yaw error signals are downshifted to intermediate frequency (I.F.) signals at different intermediate frequencies within the pass band of a single I.F. channel, then demultiplexed and normalized, the angle error of a target may be derived.

It is also known in the art that a monopulse receiver with a two-channel I.F. receiver may be used with a so-called "dot-product angle-error-detector circuit" to derive angle error signals. Thus, if the R.F. monopulse sum signal is alternately combined the pitch and yaw error signal to produce composite signals (S+D) and (S−D) (where S is the monopulse sum signal and D is either the pitch or the yaw error signal), such composite signals may be downshifted to an appropriate I.F. frequency, passed through a two-channel I.F. amplifier and applied to a dot-product angle error detector circuit, or equivalent, finally to derive the desired angle error of a target.

Although known single channel or two-channel monopulse receivers may be useful in many circumstances, neither is satisfactory in all applications. Thus, the single channel receiver may suffer from cross-coupling between the monopulse pitch and yaw error signals, with the result that a correct determination of the angle error of any target cannot be made. Further, the use of an I.F. amplifier with a wide pass band decreases the signal-to-noise ratio and also renders such an amplifier more susceptible to jamming. With the two-channel I.F. amplifier, satisfactory operation requires that:

(a) amplitude and phase imbalances between the two channels be limited to very low amounts, and (b) such receiver be used in a benign environment, meaning that jamming signals prevent proper operation of a two-channel I.F. amplifier.

The problems experienced in the use of a two-channel I.F. amplifier are exacerbated when post detection integration (PDI) of the output of a fast Fourier Transform (FFT) is required to increase sensitivity. PDI is accomplished by: (a) processing echo signals in each one of N successive intervals (sometimes referred to as "FFT dwells") to obtain the data required for an N point Fast Fourier Transform for pitch (or yaw); and (b) then deriving the average of M successive FFT dwells. In terms of pulse repetition intervals, the time required to perform PDI, i.e., the length of a PDI dwell, is equal to N·M pulse repetition intervals. In many practical cases the actual time required to perform a PDI for either pitch or yaw error signals may be in the order of tens of milliseconds. Obviously, then, the actual time required to perform PDI on both pitch error signals and yaw error signals is at least twice the time required to perform PDI on either one of such error signals.

In known two-channel monopulse receivers using PDI, an automatic gain control (AGC) signal is determined just prior to each PDI dwell. An AGC signal so derived is predictive and therefore cannot compensate for unpredictable fluctuations in the amplitude of the sum signal during each PDI dwell. It follows then that a constant angle-error sensitivity may not always be attained.

In addition to the just-discussed difficulty, it is known that gain and phase imbalance between two I.F. amplifiers in a two-channel monopulse receiver may change unpredictably with time and signal level. Therefore, even though the effect of a known amount of gain and phase imbalance could be tolerated (because the resulting fixed bias error in bore-sight could be "calibrated out"), unacceptably large errors due to any such imbalances may be experienced in any monopulse receiver using PDI as described above. It will be noted that, according to the prior art, amplitude and phase imbalances between two I.F. amplifier channels are at least as deleterious to proper operation of a finite impulse response (FIR) filter as to an FFT filter with PDI.

Both a FIR filter and an FFT filter with PDI here are inherently susceptible to improper operation in any environment in which the signal-to-noise ratio (SNR) is low. This is so because, when time-multiplexing is used in processing pitch and yaw error signals, slightly less than half the available signal energy defining either pitch error or yaw error is used. As a result, then, the SNR of the receiver is lowered by some 3 db. Any lowering of the SNR of course increases angle noise associated with any target, making it more difficult to achieve a successful intercept.

Finally, because it may be easy to detect the rate at which any time-multiplexing process between pitch error and yaw error signals is being carried out, any monopulse radar using a two-channel I.F. amplifier is vulnerable to jamming. This is so particularly if the AGC function is synchronized in some fashion to the time-multiplexing process.

SUMMARY OF THE INVENTION

With the foregoing background in mind, it is a primary object of this invention to provide a two-channel monopulse receiver in which pitch error and yaw error signals may be derived simultaneously and continuously.

Another object of this invention is to provide a two-channel monopulse receiver in which phase and amplitude imbalances of any degree between two I.F. amplifiers are almost completely compensated.

Still another object of this invention is to provide an improved two-channel monopulse receiver that is not susceptible to jamming based on the use of a detectable time-multiplexing technique in such a receiver.

The foregoing and other objects of this invention are generally achieved in a pulse radar having a monopulse receiver with two I.F. amplifier channels, A and B, by: (a) forming I.F. signals designated $[S+(p+jy)]$ and $[S-(p+jy)]$, where S is the monopulse sum signal and $(p-jy)$ is the quadrature sum of monopulse pitch and yaw error signals; (b) multiplexing the I.F. signals so that, during successive equal intervals of time, the I.F. signal $[S+(p+jy)]$ is applied to I.F. amplifier channel A and the I.F. signal $[S-(p-jy)]$ is applied to I.F. amplifier channel B and then the I.F. signal $[S-(p-jy)]$ is applied to I.F. amplifier B and the I.F. signal $[S-(p+jy)]$ is applied to I.F. amplifier channel A; (c) demodulating the I.F. signals to derive corresponding baseband signals; (d) demultiplexing the baseband signals so that signal $[S+(p+jy)]$, as amplified in both I.F. amplifier channels A and B, appears on a first signal line and the signal $[S-(p+jy)]$, as amplified in both I.F. amplifier channels A and B, appears on a second signal line; and (e) processing the signals on the first and the second signal lines to derive normalized pitch and yaw angle error signals.

BRIEF DESCRIPTION OF THE DRAWINGS

For a more complete understanding of this invention, reference is now made to the following description of the accompanying drawings, wherein.

DESCRIPTION OF THE PREFERRED EMBODIMENT

Figure 1:
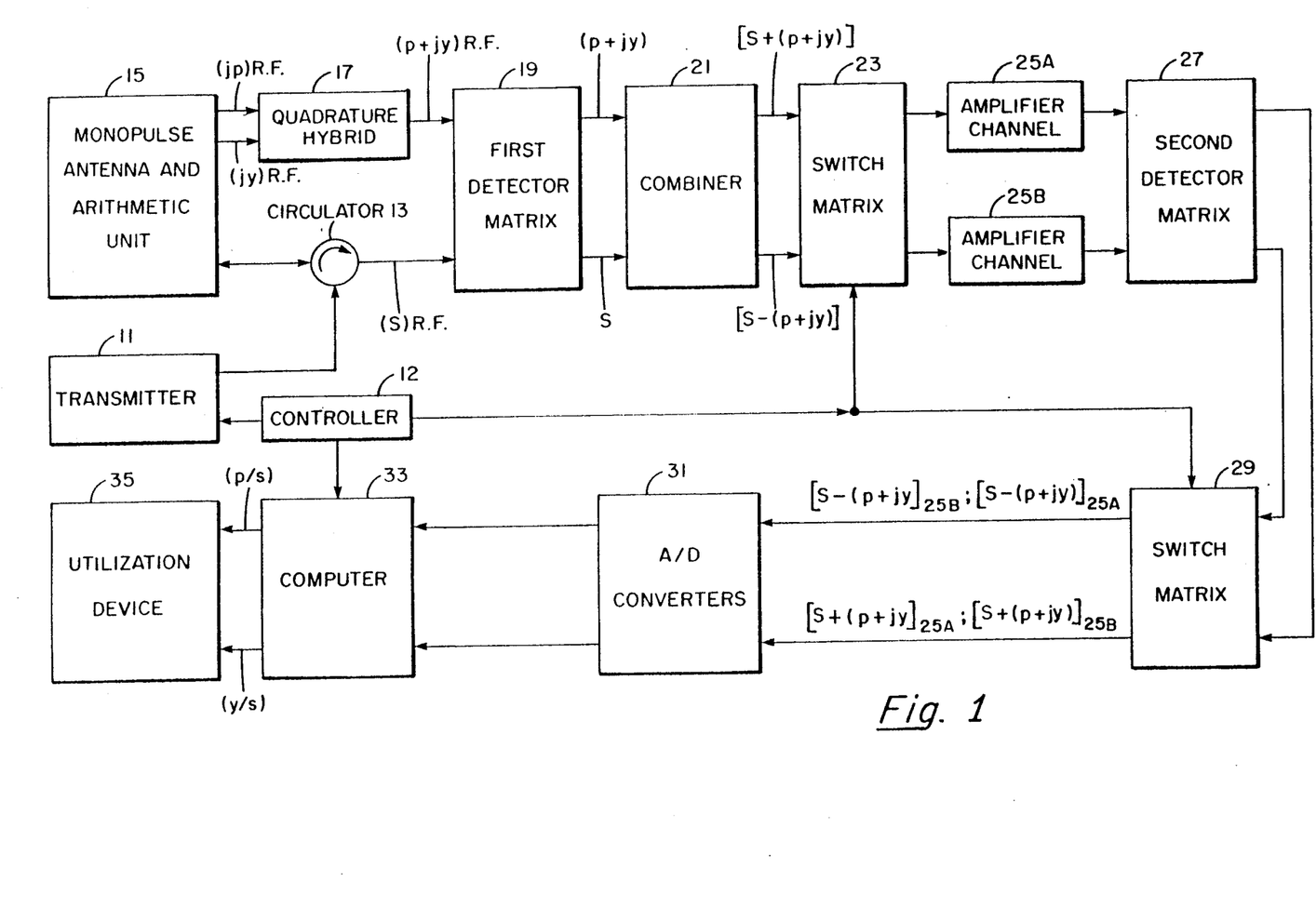
FIG. 1 is a generalized block diagram of a pulse radar incorporating the invention.
Figure 2:
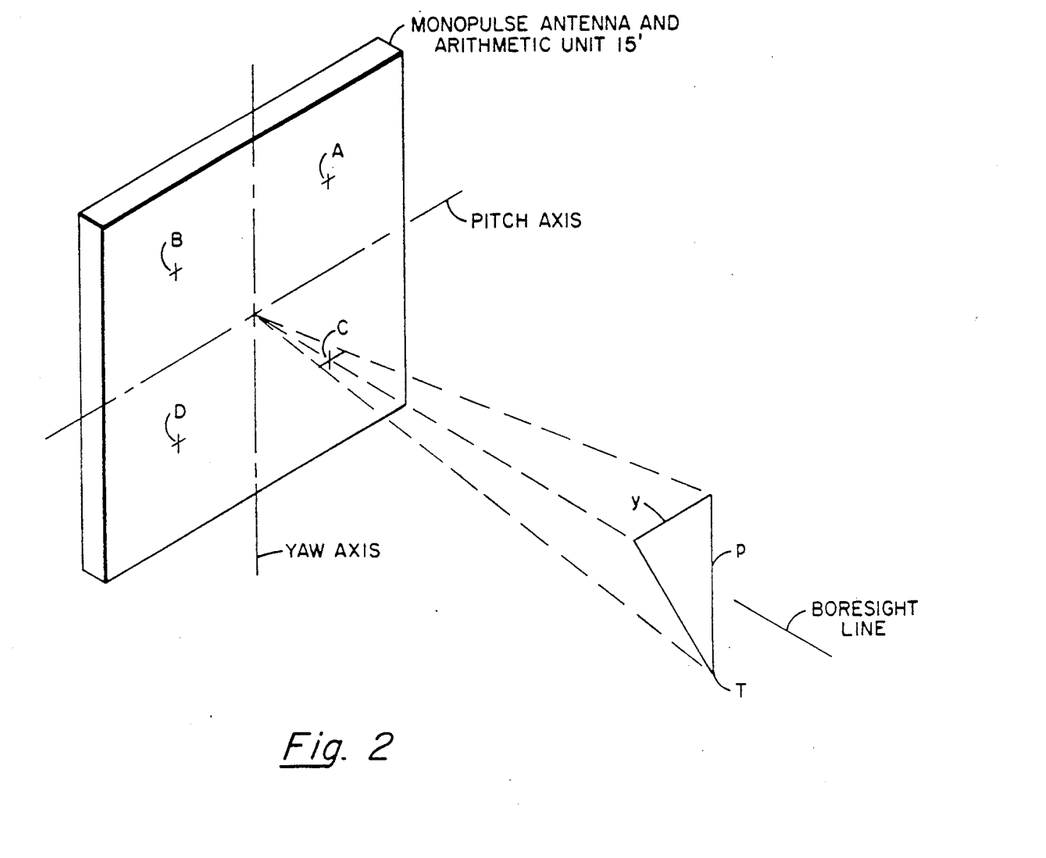
FIG. 2 is a sketch illustrating an exemplary layout of a monopulse antenna showing how monopulse sum, pitch error and yaw error signals may be derived from a target.

Referring now to FIG. 1, the general layout of a monopulse radar according to this invention is shown. In particular, the block diagram of FIG. 1 is illustrative of the contemplated method of processing monopulse signals to eliminate the effect of phase and amplitude imbalances in a two-channel monopulse receiver. Thus, a transmitter 11 (actuated in response to a trigger signal from a controller 12) is connected, via a circulator 13, to a monopulse antenna and arithmetic unit 15. The just-mentioned elements are conventional in construction to produce, in the monopulse antenna and arithmetic unit 15, a sum beam (not shown) of radio frequency energy, such beam here having a bore-sight line (FIG. 2) orthogonal to the aperture of the monopulse antenna. That aperture, as shown in FIG. 2, here is divided into four equal sectors (or quadrants), each with a phase center A, B, C or D. As is known, the radio frequency (R.F.) signal in the receive mode at each phase center A, B, C and D is the vectorial sum of the R.F. signals received by the antenna elements (not shown) in the corresponding quadrant. It will be appreciated, therefore, that (in the receive mode) the monopulse sum signal, S(R.F.), the pitch error signal, jp (R.F.) and the yaw error signal jy(R.F.) derived from a single target and appearing at the various output ports of the illustrated monopulse antenna and arithmetic unit 15 may be described as follows:

$$S(R.F.) = V_A - V_B - V_C - V_D \quad \text{Eq. (1)}$$
$$jp(R.F.) = (V_A - V_B) - (V_C - V_D) \quad \text{Eq. (2)}$$
$$jy(R.F.) = (V_A - V_C) - (V_B - V_D) \quad \text{Eq. (3)}$$

where $V_a$, $V_B$, and $V_D$ are the R.F. signals at each phase center and j is equal to $(-1)^{\frac{1}{2}}$.

$V_A$, $V_B$, $V_C$ and $V_D$ each is a vectorial quantity and the operator j is an indicator that the pitch and yaw error signals (which also are vectorial quantities) are in quadrature with the monopulse sum signal S(R.F.) (which also is a vectorial quantity). Thus, even though the phase of each one of the three monopulse signals S(R.F.), jp(R.F.) and jy(R.F.) with respect to any set of reference axes may be unknown, the phase of each one of the pitch and yaw error signals, jp(R.F.) and jy(R.F.) relative to the monopulse sum signal S(R.F.) is known to be 90° when the R.F. energy impinging on the monopulse antenna and arithmetic unit 15 in the receiving mode is from a single source, such as "T" in FIG. 2.

The monopulse sum signal, S(R.F.), after passing through the circulator 13, is converted to a sum signal S at any convenient intermediate frequency. The pitch error signal, jp(R.F.), is passed through a quadrature hybrid 17 wherein: (a) the phase of the pitch error signal jp(R.F.) is rotated by 90° into phase with the monopulse sum signal S(R.F.) to form a pitch signal, p(R.F.) ; and (b) the pitch signal p(R.F.) and the yaw error signal jy(R.F.) are combined to form a difference error signal at R.F. defined by $(p+jy)$ R.F.. Such difference error signal then is converted from R.F. to a difference error signal $(p+jy)$ at any convenient I.F. frequency. Here down-conversion of the monopulse sum signal S(R.F.) and of the difference error signal $(p+jy)$ R.F. is accomplished in a first detector matrix 19 of conventional construction. Such matrix may, for example, include: (a) a sum mixer (not shown) to which the monopulse sum signal S(R.F.) and a reference signal from a first local oscillator (not shown) are applied; (b) a difference error mixer (not shown) to which the difference error signal $(p+jy)$ R.F. and the reference signal are applied; and (c) appropriate filters.

The sum signal S and the difference error signal $(p+jy)$ are passed through a combiner 21 to form the composite signals $[S+(p+jy)]$ and $[S-(p+jy)]$. The combiner 21 may consist of a magic tee or of: (a) an adder (not shown), i.e., a summing amplifier, to which the sum signal S and the difference error signal $(p+jy)$ are applied to obtain the composite signal $[S+(p+jy)]$; and (b) a subtractor (not shown), i.e., a differential amplifier, to obtain the composite signal $[S-(p+jy)]$.

The composite signal $[S-(p+jy)]$ is sequentially applied, through a switch matrix 23, to an amplifier channel 25A and an amplifier channel 25B and, simultaneously, the composite signal $[S-(p+jy)]$ is sequentially applied through the switch matrix 23 to the amplifier channel 25B and to the amplifier channel 25A. The switch matrix 23 is operative in a manner similar to the way in which a double-pole double-throw switch operates. That is to say, whenever the composite signal $[S+(p+jy)]$ is applied to the amplifier channel 25A, the composite signal $[S-(p+jy)]$ is applied to the amplifier channel 25B, and vice versa.

The outputs of the amplifier channels 25A, 25B are connected to a second detector matrix 27. Such matrix is conventional, being made up of a first mixer (not shown) to which the output of amplifier channel 25A is connected and a second mixer (not shown) to which the output of amplifier channel 25B is connected, with a common reference signal from a second local oscillator (not shown) being connected to both the first and the second mixer. The signals out of the second detector matrix 27 are baseband signals as indicated in TABLE I.

TABLE I

|  | Odd Intervals | Even Intervals |
|---|---|---|
| First Mixer | $[S + (p + jy)]$ 25A | $[S - (p + jy)]$ 25A |
| Second Mixer | $[S - (p + jy)]$ 25B | $[S + (p + jy)]$ 25B | where the subscripts 25A, 25B indicate outputs of amplifier channels 25A, 25B. It will be noted that, even though the magnitude of the difference error signal $(p+jy)$ is almost always very much smaller than the magnitude of the sum signal S, imbalances in phase or amplitude between the amplifiers 25A, 25B introduce errors in composite signals $[S+(p+jy)]$ 25A; $[S+(p+jy)]$ 25B; $[S-(p+jy)]$ 25A; and $[S-(p+jy)]$ 25B.

The signals out of the second detector matrix 27 are connected to a switch matrix 29 (which switch operates to demultiplex the composite signals out of the second detector matrix 27). That is to say, switch matrix 29 is operative to cause the composite signals $[S+(p+jy)]$ 25A and $[S+(p+jy)]$ 25B to appear in successive intervals on one line (not numbered) out of the switch matrix 29 and, simultaneously, to cause the composite signals $[S-(p+jy)]$ 25B and $[S+(p+jy)]$ 25A to appear on a second line (not numbered) out of the switch matrix 29.

The lines out of the switch matrix 29 are connected to analog-to-digital converters (A/D converters 31) wherein the analog signals on such lines are changed in a conventional manner to digital signals. The outputs of the A/D converters 31 are fed to a computer 33 wherein processing is effected in any desired manner to derive the desired pitch and yaw error signals to actuate a utilization device 35. The latter may, for example, be a conventional auto-pilot (not shown) to control the trajectory of a guided missile (not shown) and a conventional antenna position controller (not shown) to maintain the orientation of the monopulse antenna 15 with respect to a target T (FIG. 2). Exemplary processing procedures carried out in the computer 33 are described hereinafter in connection with FIGS. 6, 7 and 8.

Figure 3A:
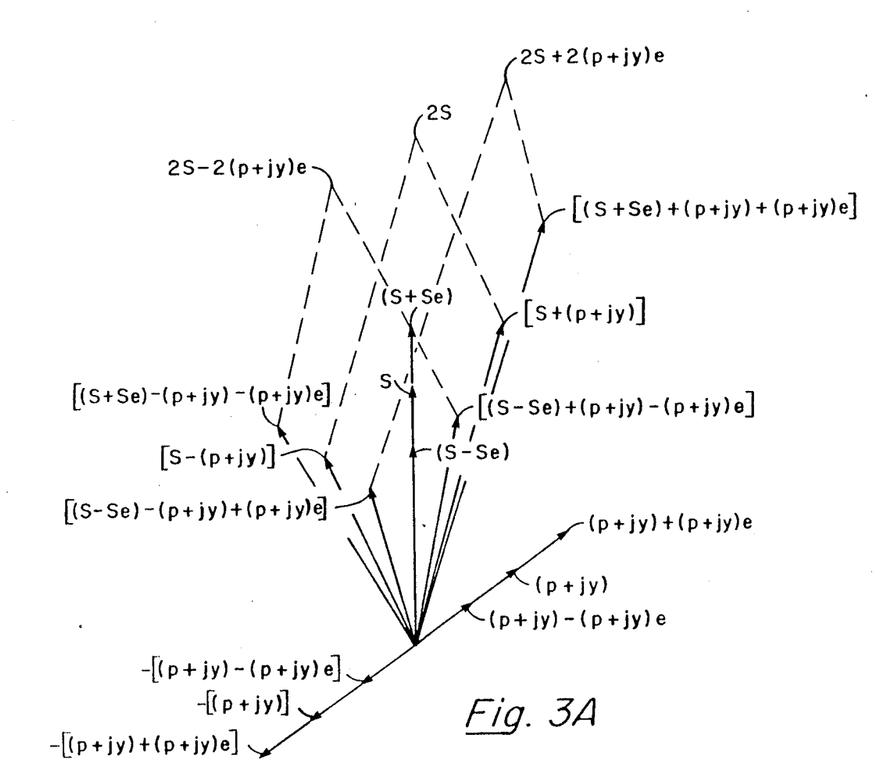
FIGS. 3A and 3B are vector diagrams showing the effects of imbalances in amplitude and phase between amplifier channels in the receiver shown in FIG. 1.

Referring to the vector diagram of FIG. 3A, the effects of any imbalances in amplitude between the amplifier channels 25A and 25B are shown. The vector diagrams of FIG. 3B demonstrate the effects of any imbalances in phase shift between the amplifier channels 25A and 25B.

Figure 3B:
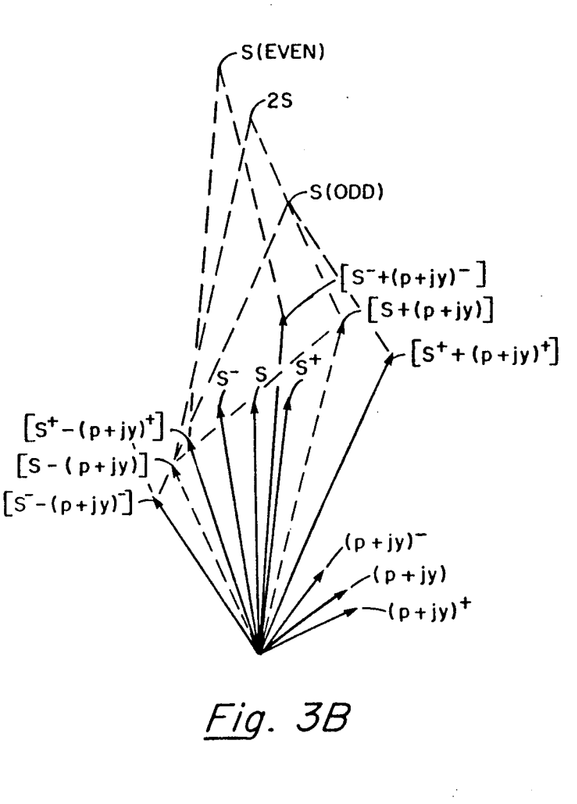

In FIGS. 3A and 3B, vector S and vectors $(p+jy)$, $-(p+jy)$ are indicative, respectively, of the monopulse sum signal, the monopulse difference error signal and the negative of the monopulse difference error signal. The vector sum of the first two just-mentioned vectors corresponds to the composite signal $[S+(p+jy)]$ out of the combiner 21. If the amplifier channels 25A, 25B are balanced, i.e., if no amplitude imbalance exists between such channels, the fact that the switch matrix 23 here causes the composite signal $[S+(p+jy)]$ to be passed alternately through amplifier channel 25A and amplifier channel 25B has no effect on the composite signal out of the second detector matrix 27.

A different situation obtains when there is an imbalance in amplitude between amplifier channels 25A, 25B. For expository purposes an imbalance $\pm$ Se and an imbalance $\pm(p+jy)e$ may be assumed and the actual amplification factor disregarded without introducing error in the explanation. During "odd numbered" intervals the composite signal out of amplifier channel 25A may be expressed as $S+Se+(+jy)+(p+jy)e$ and the composite signal out of amplifier channel 25B may be expressed as $S-Se-(p+jy)+(p+jy)e$. The sum of the composite signals during odd numbered intervals is $2S+2(p+jy)e$ and the difference between the composite signals is $2(p+jy)+2Se$. During even numbered PRIs the composite signal out of amplifier channel 25B may be expressed as $S-Se+(p+jy)-(p+jy)e$ and the composite signal out of channel 25A may be expressed as $S+Se-(p+jy)-(p+jy)e$. The sum of the composite signals during each "even numbered" interval is $2S-2(p+jy)e$ and the difference between the composite signals out of the subtractor 29 is $2Se-2(p+jy)$.

As shown in FIG. 3B, the results of imbalances in phase shifts of the composite signals passing through the amplifier channels 25A, 25B are similar to the results of imbalances in amplitude. Thus, if there are no imbalances, the composite signals $S+(p+jy)$ and $S-(p+jy)$ are the same in odd numbered and even numbered intervals and the sum of and difference between such signals are respectively, $2S$ and $2(p+jy)$. With a positive phase shift incurred in amplifier channel 25A, S may be deemed to be rotated to $S^+$ and $(p+jy)$ rotated to $(p+jy)^+$. With a negative phase shift of the same magnitude incurred in amplifier channel 25B, S may be deemed to be rotated to $S^-$ and $(p+jy)$ rotated to $(p+jy)^-$. During each odd numbered interval, the composite signal out of amplifier channel 25A may be designated as $(S^+ +(p+jy)^+)$ and the composite signal out of amplifier channel 25B may be designated as $(S^- -(p+jy)^-)$. Similarly, during each even numbered interval, the composite signal out of amplifier channel 25B may be designated a $(S^- +(p+jy))$ and the composite signal out of amplifier channel 25A may be designated as $S+ -(p+jy)^+$. The superscript "+" represents the vector S or $(p+jy)$ after a positive phase shift and the superscript "−" represents the vector S or $(p+jy)$ after a negative phase shift. Thus, when the amplifier channels 25A, 25B suffer no imbalance in phase shifts, the sum of the composite signals out of such channels at any time is $2S$ and the difference between such composite signals is $2(p+jy)$. When an imbalance in phase shifts exists then: (a) during odd intervals the sum of the composite signals out of the amplifier channels 25A, 25B is S(ODD) and the difference between such composite signals is $[S^+ +(p+jy)^+]-[S^- -(p+jy)^-]$; and (b) during even intervals the sum of the composite signals out of the amplifier channels 25A, 25B is S(EVEN) and the difference between such composite signals is $[S^- +(p+jy)^-]-[S^+ -(p+jy)^+]$. With small imbalances, the average of the sums and differences in an even number of intervals approximates $2S$ and $(p+jy)$.

Figure 4:
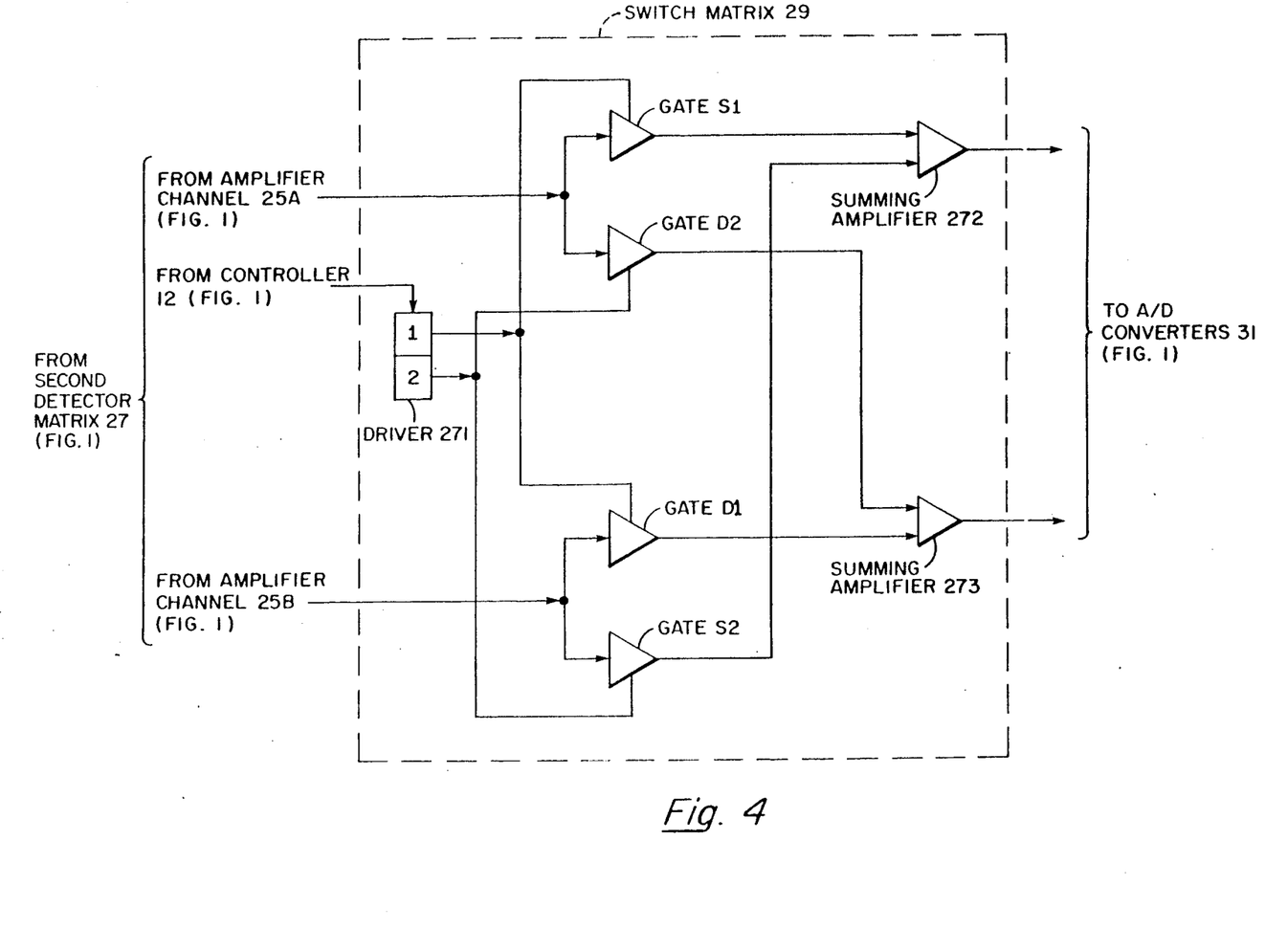
FIG. 4 is a block diagram showing how demultiplexing of signals may be effected in the receiver shown in FIG. 1.

Referring now to FIG. 4, an exemplary switch matrix (switch matrix 29, FIG. 1) is shown. Thus, the composite signal out of the amplifier channel 25A (FIG. 1) is, after passing through the second detector matrix 27, divided into two equal portions, with one such portion being applied to a gate S1 and the other such portion being applied to a gate D2. Similarly, the composite signal out of the amplifier channel 25B is, after passing through the second detector matrix 27, divided into two equal portions, with one such portion being applied to a gate S2 and the other such portion being applied to a gate D1. Each one of the just-mentioned gates may be a conventional gated amplifier having an enabling terminal (not numbered). An enabling (or disabling) signal for each gate S1, S2, D1, D2 is derived, as shown, from a driver 271. Such driver may be a bistable multivibrator actuated by successively occurring signals from the controller 12 (FIG. 1). The normal output of such a multivibrator is connected to the enabling terminals of gates S1 and D1 and the complementary output is connected to the enabling terminals of gates S2 and D2. Gates S1 and S2 are connected to a summing amplifier 272 and gates D1 and D2 are connected to a summing amplifier 273. The signals out of the summing amplifier 272, 273 are connected to A/D converters 31 (FIG. 1). During a first interval, gates S1 and D1 are open and gates S2 and D2 are closed. The signal then extant at the output of amplifier channel 25A (say composite signal $[S+(p+jy)]$) when no phase imbalance exists, or composite signal $[S+Se+(p+jy)+(p+jy)e]$ when an imbalance in amplitude exists, or composite signal $[S^+ +(p+jy+)]$ when an imbalance in phase exists, or a vectorial sum of the latter two composite signals) is passed, via summing amplifier 272 to A/D converters 31 (FIG. 1). Similarly, during the same interval gate D1 is enabled to permit composite signal $[S-(p+jy)]$, $[S-Se-(p+jy)+ (p+jy)e]$, $[S^- -(p+jy^-)]$ or the vectorial sum of the latter two composite signals to be passed from amplifier channel 25B, via summing amplifier 273 to A/D converters 31 (FIG. 1). After driver 271 changes state in response to the next following signal from the controller 12 (FIG. 1), gates S2 and D2 are opened and gates S1 and D1 are closed. As a result, then, the then extant output of amplifier channel 25A is passed, via gate D2 and summing amplifier 273, to A/D converters 31 and the then extant output of amplifier channel 25B is passed, via gate S2 and summing amplifier 272, to A/D converters 31 (FIG. 1).

It will be noted here that the switch matrix 27 just described may be used as the switch matrix 23 (FIG. 1). Thus, (a) if the composite signal $[S+(p+jy)]$ out of the combiner 21 (FIG. 1) is applied to the gates S1 and D2 in place of composite signals derived from amplifier channel 25A; (b) the composite signal $[S (p+jy)]$ is applied to the gates S2 and D1 in place of the composite signals derived from amplifier channel 25B; (c) the output of the summing amplifier 272 is connected to the input of the amplifier channel 25A (FIG. 1) rather than to A/D converters 31; and (d) the output of the summing amplifier 273 is connected to the input of the amplifier channel 25B (FIG. 1) rather than to A/D converters 31, then the desired switching of input signals to the amplifier channels 25A, 25B will be attained.

Figure 5:
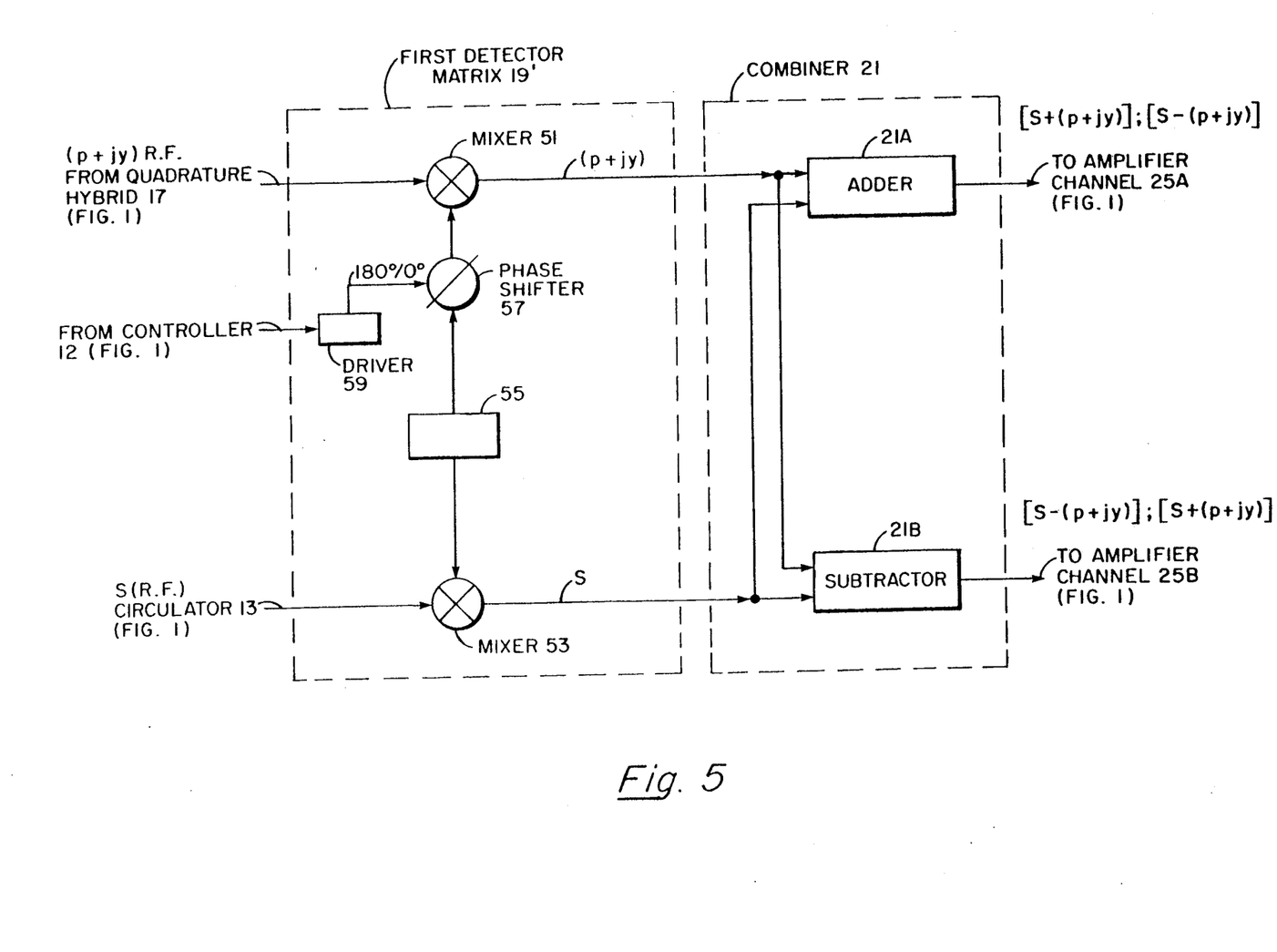
FIG. 5 is a block diagram showing an alternative way in which multiplexing of signals may be effected in the receiver shown in FIG. 1.

Referring now to FIG. 5, it may be seen that the switch matrix 23 is not required if the phase of the reference signal is appropriately controlled during down-conversion of the difference error signal $(p+jy)$.R.F. in the first detector matrix 19' (with matrix 19' corresponding to first detector matrix 19 (FIG. 1)). Thus, the first detector matrix 19' may include a mixer 51 and a mixer 53 to which the difference error signal $(p+jy)$ R.F. and the monopulse sum signal S(R.F.) are applied as shown. A reference signal from a local oscillator (L.O. 55) is applied directly to the mixer 53. A reference signal from the L.O. 55 is applied, via a phase shifter 57, to the mixer 51. The phase shifter 57 is arranged so that, in response to control signals from a driver 59, the phase of the reference signal is either reversed, i.e., shifted by 180°, or is unaffected, i.e., shifted by 0°. The driver 59 in turn is actuated by successively occurring signals from the controller 12 (FIG. 1) that indicate the beginning of each successive interval. It may be seen now that the mixer 53 is indicative of a monopulse sum signal at a selected I.F. frequency but that, during each interval between successively occurring signals from the controller 12 (FIG. 1), the output of the mixer 51 changes from $+(p+jy)$ to $-(p+jy)$. It follows then that, during each successive pair of intervals, composite signals $[S+(p+jy)]$ and $[S-(p+jy)]$ are produced by adder 21A and composite signals $[S-(p+jy)]$ and $[S+(p+jy)]$ are produced by adder 21B.

Figure 6:
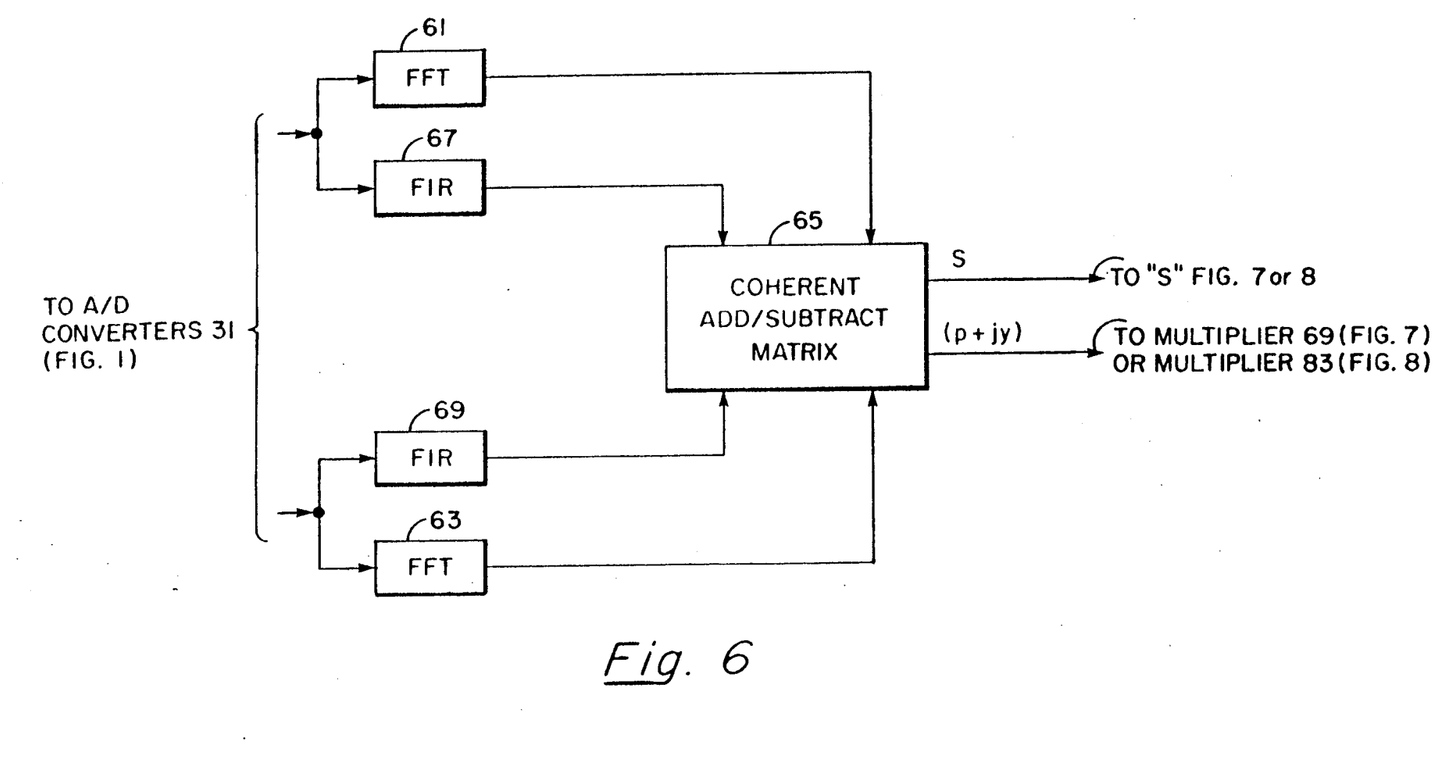
FIGS. 6, 7 and 8 are functional block diagrams illustrating various ways in which signals out of the receiver shown in FIG. 1 may be processed.

It will now be appreciated that the effect of any imbalance (whether in amplitude, phase or some combination of the two) between the amplifier channels 25A, 25B (FIG. 1) shows up in the amplitude and phase of successive digital signals out of the A/D converters 31 (FIG. 1). However, any one of several methods of equalization may be followed, in combination with normal monopulse angle error processing. Thus, if post detection integration (PDI) is used, digital signals in any even number of successive intervals may be averaged using either batch or pipeline processing. Thus, as shown in FIG. 6, digital signals derived from amplifier channel 25A (FIG. 1) may be applied to a fast Fourier transform, FFT 61, and digital signals derived from amplifier channel 25B (FIG. 1) may be applied to a fast Fourier transform (FFT 63) that is similar to FFT 61 for processing. After completion of processing in FFT 61, 63 corresponding outputs of FFT 61, 63 are added and subtracted in a coherent ADD/SUBTRACT matrix 65. Alternatively, to perform pipeline processing, successive digital numbers are impressed on finite impulse filters (FIR 67, FIR 69) and corresponding outputs of such filters are added and subtracted in the coherent ADD/SUBTRACT matrix 65. In either case, any effect of imbalance is substantially eliminated from the outputs of the coherent ADD/SUBTRACT matrix 65.

Figure 7:
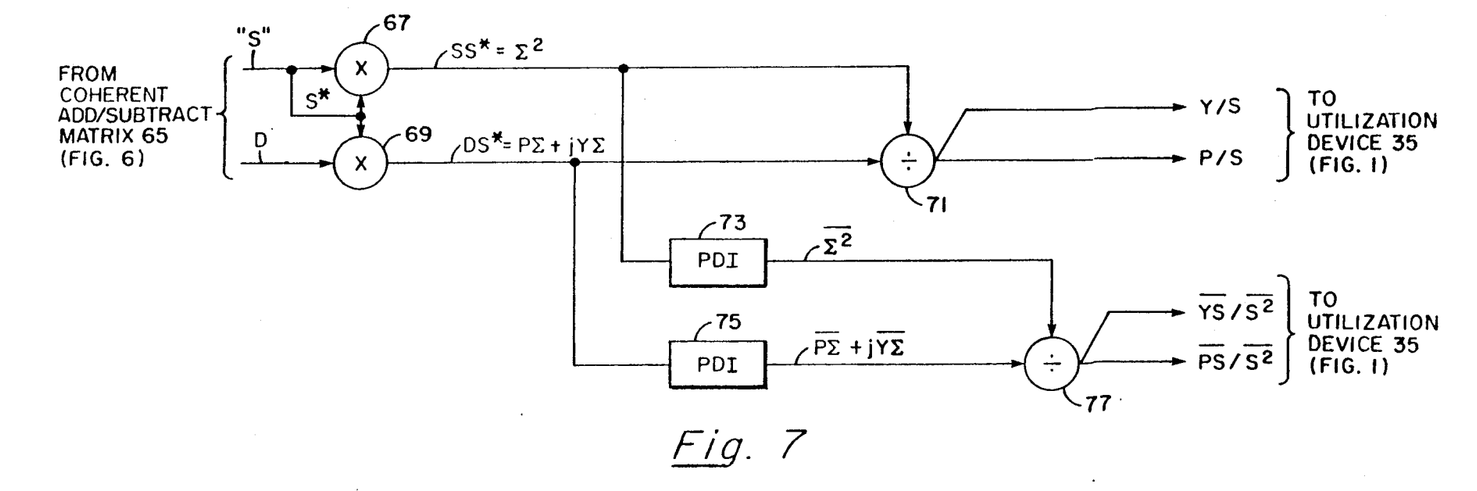
Figure 8:
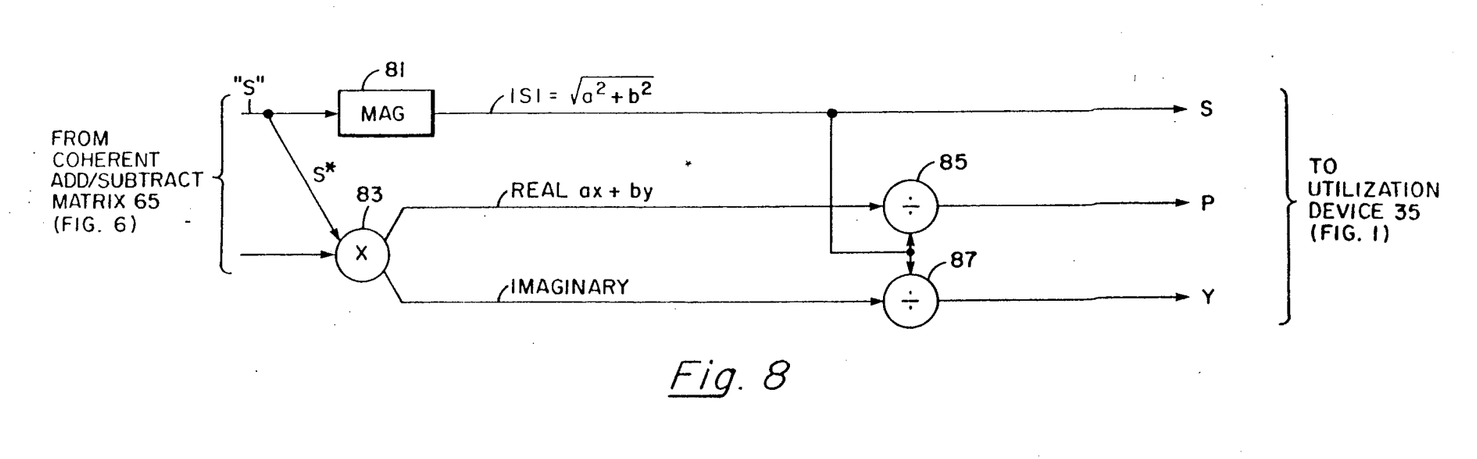

Various optional methods of processing the outputs of the coherent ADD/SUBTRACT matrix 65 are shown in FIGS. 7 and 8. Thus, if monopulse ratios are to be derived, each input of the coherent ADD/SUBTRACT matrix 65 is multiplied (in multipliers 67, 69) by the complex conjugate of the sum signal S* out of such matrix and the output of the multiplier 69 is divided (in divider 71) by the output of the multiplier 67. Alternatively, integration (in PDI 73 and PDI 75) of the outputs of the multipliers 67, 69 may be accomplished before division (in divider 77) to derive pitch and yaw monopulse ratio estimates.

If sum, pitch error and yaw error signals are required separately, then the magnitude of the sum signal is first found in either a "look up table" or by extracting, in element 81, square root of the product of the sum signal out of the coherent ADD/SUBTRACT matrix 65. The values of the monopulse pitch error, P, and the monopulse yaw error Y are then derived as shown by operation of multiplier 85 and dividers 85, 87.

It will now be obvious to one of skill in the art that demultiplexing of the difference error signal, i.e., separating the pitch, p, and yaw, jy, components of the difference error signal $(p+jy)$, may be accomplished before conversion of the analog signals out of the switch matrix 29 (FIG. 1). Thus, the outputs out of the switch matrix 29 may be processed in a synchronous detector matrix (not shown) to effect the desired demultiplexing. In such matrix the outputs of the switch matrix 29 would: (a) first be added together to produce a reference signal proportional to the monopulse sum signal, S; (b) the outputs of the switch matrix 29 would be subtracted one from the other to produce an angle error signal proportional to the difference error signal (p+jy); the angle error signal would be applied to each one of a pair of phase detectors; and the reference signal would be applied directly to one of the pair of phase detectors and, after having been shifted in phase by 90°, to the other one of the pair of phase detectors. The A/D converters 31 (FIG. 1) would then, of course, be modified to separately, but simultaneously, convert the sum signal S and the demultiplexed angle error signals. It will also be obvious that an analog integrator (not shown) could also be used in circuit before the A/D converters 31 (FIG. 1).

Having described embodiments of this invention, it will now be apparent to one of skill in the art that changes may be made without departing from the concept of: (a) first forming two composite signals descriptive of the monopulse sum, pitch and yaw error for amplification in a two-channel amplifier in such a manner that any imbalance (whether of phase or amplitude) engendered in such amplifier equally affects each one of the two amplified composite signals; and then (b) processing the two amplified composite signals to eliminate any effect of imbalance and to derive monopulse error signals in any known manner. Thus, it is evident that the way in which the angle error signal is derived may be changed so that signal is described by (y+jp) rather than (p+jy) or (p−jy) or (y−jp). It is felt, therefore, that this invention should not be restricted to the described embodiments, but rather should be limited only by the spirit and scope of the appended claims.

What is claimed is:

1. In the operation of a monopulse receiver, such receiver having a first and a second output terminal and a first and a second amplifier channel wherein the monopulse sum signal, S, the pitch error signal, p, and the yaw error signal, y, may be derived simultaneously from corresponding receiver signals, the method of:
    (a) forming a pair of composite signals defined as [S+(p+jy)] and [S−(p+jy)];
    (b) during a first interval, passing the composite signal [S+(p+jy)] through the first amplifier channel to the first output terminal and the composite signal [S−(p+jy)] through the second amplifier channel to the second output terminal;
    (c) during a second interval following the first interval, passing the composite signal [S+(p+jy)] through the second amplifier channel to the first output terminal and the composite signal [S−(p+jy)] through the first amplifier channel to the second output terminal;
    (d) repeating steps (a), (b) and (c) during successively occurring intervals to provide an even number of successively amplified composite signals [S+(p+jy)] at the first output terminal and a like even number of successively amplified composite signals [S−(p+jy)] at the second output terminal; and
    (e) separately averaging each even number of successively amplified composite signals [S+(p+jy)], [S−(p+jy)].

2. The method as in claim 1 with the additional steps of:
    (a) adding the averaged composite signal [S+(p+jy)] and the averaged composite signal [S−(p+jy)] to derive a signal representative of S; and
    (b) subtracting the averaged composite signal [S−(p+jy)] from the averaged composite signal [S+(p+jy)] to derive a signal representative of (p+jy).

3. The method as in claim 2 with the additional step of demultiplexing the signal representative of (p+jy) to derive a signal representative of p and a signal representative of y.

4. The method as in claim 3 with the additional steps of:
    (a) dividing the signal representative of p by the signal representative of S to derive a pitch monopulse ratio; and
    (b) dividing the signal representative of y by the signal representative of S to derive a yaw monopulse ratio.

5. The method as in claim 3 with the additional steps of:
    (a) deriving an N-point Fourier transform of all monopulse signals derived during N successive intervals, where N is an even integer;
    (b) averaging each one of the N points in M successively derived N-point Fourier transforms, where M is an integer.

6. The method as in claim 3 with the additional step of passing all monopulse signals derived in M successive intervals through a finite impulse filter, where M is an even integer.

7. In a two-channel receiver for a monopulse radar wherein a monopulse sum, S, a pitch error, p, and a yaw error, y, signal are processed, the improvement comprising:
    (a) means for multiplexing the p and the y signals to form a signal (p+jy), where j equals $(-1)^{\frac{1}{2}}$;
    (b) means for combining the S signal and the signal (p+jy) to form a first composite signal [S+(p+jy)] and a second composite signal [S−(p+jy)];
    (c) means, responsive to successively occurring control signals, for alternately applying the [S+(p+jy)] signal to one and then the other amplifier channel and for simultaneously applying the [S−(p+jy)] signal to the amplifier channel to which the [S+(p+jy)] signal is not applied; and
    (d) means, responsive to successively occurring control signals, for passing each [S+p+jy)] signal out of the amplifier channels over a first output line and each [S−(p+jy)] signal out of the amplifier channels over a second output line.

8. The improvement as in claim 7 with, additionally, means for averaging the [S+(p+jy)] signals on the first output line and for averaging the S−(p+jy)] signals on the second output line.

* * * * *